US007643438B2

(12) United States Patent
Lee et al.

(10) Patent No.: US 7,643,438 B2
(45) Date of Patent: Jan. 5, 2010

(54) METHOD OF DETERMINING RANDOM ACCESS CHANNEL PREAMBLE DETECTION PERFORMANCE IN A COMMUNICATION SYSTEM

(75) Inventors: Jung Ah Lee, Pittstown, NJ (US); Shirish Nagaraj, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1179 days.

(21) Appl. No.: 10/649,797

(22) Filed: Aug. 28, 2003

(65) Prior Publication Data

US 2005/0047347 A1 Mar. 3, 2005

(51) Int. Cl.
*H04B 7/00* (2006.01)
*H04B 1/00* (2006.01)

(52) U.S. Cl. ............... 370/310.2; 370/334; 370/350; 370/483; 455/63.4; 455/562.1

(58) Field of Classification Search ............... 370/310, 370/333, 337, 462, 321, 335, 329, 330, 310.2, 370/334, 350, 483; 455/428, 234.2, 522, 455/226.2, 67.11, 83.4, 562.1
See application file for complete search history.

(56) References Cited

U.S. PATENT DOCUMENTS

| 5,204,976 | A  | * | 4/1993  | Baldwin et al. | ......... | 455/234.2 |
| 6,112,085 | A  | * | 8/2000  | Garner et al. | ............ | 455/428 |
| 6,178,196 | B1 | * | 1/2001  | Naguib et al. | ............ | 375/148 |
| 6,487,420 | B1 | * | 11/2002 | Jonsson | ...................... | 455/522 |
| 6,549,585 | B2 | * | 4/2003  | Naguib et al. | ............ | 375/267 |
| 6,795,424 | B1 | * | 9/2004  | Kapoor et al. | ............ | 370/343 |
| 6,823,170 | B1 | * | 11/2004 | Dent | ........................ | 455/13.3 |
| 6,865,237 | B1 | * | 3/2005  | Boariu et al. | ............ | 375/295 |
| 6,873,607 | B1 | * | 3/2005  | Hamada et al. | ........... | 370/321 |
| 6,891,897 | B1 | * | 5/2005  | Bevan et al. | ............. | 375/265 |
| 7,054,664 | B2 | * | 5/2006  | Nagaraj | ................... | 455/562.1 |
| 7,161,952 | B1 | * | 1/2007  | Herrmann | .................. | 370/462 |
| 7,243,064 | B2 | * | 7/2007  | Paris | ........................ | 704/219 |
| 7,251,460 | B2 | * | 7/2007  | Khatri | ...................... | 455/101 |
| 7,305,211 | B2 | * | 12/2007 | Dent | ........................ | 455/12.1 |

(Continued)

OTHER PUBLICATIONS

Performance enhancement through joint detection of cochannelsignals using diversity arrays; Grant, S.J. Cavers J.K. Sch. of Eng. Sci., Simon Fraser Univ., Burnaby, BC ; This paper appears in: Communications, IEEE Transactions on Publication Date: Aug. 1998; vol. 46, Issue 8; On pp. 1038-1049.*

(Continued)

*Primary Examiner*—Ayaz Sheikh
*Assistant Examiner*—Salman Ahmed
(74) *Attorney, Agent, or Firm*—Harness, Dickey & Pierce

(57) ABSTRACT

In a method for determining link level performance of random access channel (RACH) preamble detection in a wireless communication system, link level performance results may be obtained without having to perform extensive simulation. Link-level performance results of RACH preamble detection may be characterized by determining a conditional detection probability. The conditional detection probability may be conditioned upon an instantaneous channel coefficient, and the conditional detection probability may be expressed in terms of an instantaneous detection metric. Instantaneous link-level performance may be characterized using a look-up table, so that a system model evaluated in accordance with the method may accurately represent instantaneous system behavior.

17 Claims, 5 Drawing Sheets

U.S. PATENT DOCUMENTS

| | | | | |
|---|---|---|---|---|
| 7,352,825 | B2* | 4/2008 | Das et al. | 375/316 |
| 7,355,961 | B2* | 4/2008 | Tirkkonen | 370/208 |
| 7,453,821 | B2* | 11/2008 | Nagaraj | 370/252 |
| 7,477,703 | B2* | 1/2009 | Hottinen et al. | 375/299 |
| 7,486,954 | B2* | 2/2009 | Lee et al. | 455/442 |
| 7,515,927 | B2* | 4/2009 | Das et al. | 455/522 |
| 7,558,191 | B2* | 7/2009 | Monogioudis et al. | 370/208 |
| 2002/0105928 | A1* | 8/2002 | Kapoor et al. | 370/334 |
| 2003/0013468 | A1* | 1/2003 | Khatri | 455/501 |
| 2003/0058972 | A1* | 3/2003 | Iochi | 375/343 |
| 2003/0112745 | A1* | 6/2003 | Zhuang et al. | 370/208 |
| 2003/0210750 | A1* | 11/2003 | Onggosanusi et al. | 375/295 |
| 2004/0101048 | A1* | 5/2004 | Paris | 375/240.12 |
| 2004/0259497 | A1* | 12/2004 | Dent | 455/13.3 |
| 2005/0174968 | A1* | 8/2005 | Kitade et al. | 370/335 |
| 2005/0185734 | A1* | 8/2005 | Hottinen et al. | 375/295 |
| 2005/0190853 | A1* | 9/2005 | Tirkkonen | 375/295 |
| 2007/0197880 | A1* | 8/2007 | Maynard et al. | 600/300 |
| 2007/0265532 | A1* | 11/2007 | Maynard et al. | 600/477 |

OTHER PUBLICATIONS

Complex space-time block codes for four Tx antennas; Tirkkonen, O. Hottinen, A.; Nokia Res. Center, Espoo; This paper appears in: Global Telecommunications Conference, 2000. GLOBECOM '00. IEEE; Publication Date: 2000 vol. 2, On pp. 1005-1009 vol. 2; Meeting Date: Nov. 27, 2000-Dec. 1, 2000; Location: San Francisco, CA, USA.*

Existence and construction of noncoherent unitary space-time codes; Tarokh, V. II-Min Kim; Dept. of Electr. Eng. & Comput. Sci., MIT, Cambridge, MA; This paper appears in: Information Theory, IEEE Transactions on Publication Date: Dec. 2002 vol. 48, Issue: 12 On pp. 3112-3117.*

Performance analysis of MIMO maximum likelihood receivers with channel correlation, colored Gaussian noise, and linear prefiltering Kiessling, M.; Inst. of Telecommun., Stuttgart Univ., Germany; This paper appears in: Communications, 2003. ICC '03. IEEE International Conference on Publication Date: 11-15 M.*

An approach to selecting metrics for detecting performance problems in information systems; Hellerstein, J.L.; Systems Management, 1996., Proceedings of IEEE Second International Workshop on Jun. 19-21, 1996 pp. 30-39.*

P. Choudhary, A. Ghosh, and L. Jalloul, "Simulate performance of W-CDMA random access channel," in ILLL Vehicular Technology Conference, vol. 4, pp. 2700-2704, Spring 2001.

3GPP TS 25.211 Version 5.4.0, Physical channels and mapping of transport channels onto physical channels(FDD). Third Generation Partnership Project, Jun. 2003.

* cited by examiner

Conventional Art

METHOD OF DETERMINING RANDOM ACCESS CHANNEL PREAMBLE DETECTION PERFORMANCE IN A COMMUNICATION SYSTEM

RELATED APPLICATION

The present application is related to and commonly assigned U.S. patent application Ser. No. (10/651,200), now a U.S. Pat. No. 7,321,645 filed Aug. 29, 2003 to Lee et al., entitled, "METHOD AND ARRANGEMENT FOR DETECTING A RANDOM ACCESS CHANNEL PREAMBLE USING MULTIPLE ANTENNA RECEPTION IN A COMMUNICATION SYSTEM", the entire contents of which are hereby incorporated by reference herein.

BACKGROUND OF THE INVENTION

1. Field of the Invention

The present invention relates to determining link-level performance of random access channel (RACH) preamble detection in a communication system.

2. Description of Related Art

Expanded efforts are underway to support the evolution of the Universal Mobile Telecommunications System (UMTS) standard, which describes a network infrastructure implementing a next generation Wideband Code Division Multiple Access (W-CDMA) air interface technology. A UMTS typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

Setting up a communication channel typically involves the UE transmitting a known sequence, such as a sequence containing a series of symbols, on an access channel that is monitored by a receiver at the Node-B. The Node-B receiver detects the known sequence and uses it for functions such as estimating the round-trip delay between the UE and Node-B.

Methodology for characterizing system-level performance of this access channel, known in UMTS as a random access channel (RACH), is currently being investigated. System-level performance is typically represented by throughput and delay. Often, average link-level performance results, such as an average signal-to-interference ratio (SIR) versus detection probability, are used in a simulation of a network or system being evaluated. To generate link-level performance results, intensive link-level simulation is typically required, depending on Doppler and angle spreads.

FIG. 1 is a simplified block diagram of a conventional link-level preamble detection technique. Current determination of link-level performance of RACH preamble detection is characterized by a detection probability $P_D$, given a false alarm probability ($P_{FA}$). The detection probability represents a probability that a RACH preamble will be detected. The false alarm probability represents a probability of an erroneous detection of a RACH preamble when the RACH preamble is not actually present. A system or network simulation is arranged with specific channel parameters such as Doppler and angle spread. Intensive repeated system simulations are required, with detection results being collected over many repeated simulation runs.

Referring to FIG. 1, this current technique, illustrated as 100, involves performing a series of intensive simulations for a plurality of RACH realizations in order to determine a probability of detection of a given RACH preamble. For a given channel realization, such as a RACH realization, an instantaneous metric is determined (function 110) based on an input channel parameter such as transmit power, coefficients reflecting channel conditions, here shown as $E_c/N_0$, which may represent a signal-to-noise ratio of a particularly received signal (e.g., a signal containing RACH preamble information), and parameters from spatial processing or temporal processing algorithms. This metric is used for determining a detection event (function 120). A threshold 'q' is also calculated for determining a detection event. This threshold is calculated (function 130) in advance based on a false alarm probability ($P_{FA}$) requirement for the given channel realization. A comparison of the metric to q is performed in function 120 to determine a detection indicator value, $I_{Det}(q)$. The indicator value represents a detection success or a detection failure of the channel. If the metric is equal to or exceeds q, the value of $I_{Det}(q)$ is set to 1, otherwise it is set to zero (0).

Functions 110-130 are repeated for each simulation run evaluating a the performance of a particular channel realization, such as RACH preamble. After a simulation has been completed for all channel realizations of interest, a probability of detection ($P_D(q)$) may be determined based on an average of the indicator values over all channel realizations (Function 140).

The above technique thus requires a series of simulation runs to determine a probability of RACH preamble detection. Moreover, the intensive link-level simulation described above captures only an average system behavior, rather than instantaneous system behavior. Accordingly, determining link level performance for a particular channel realization at a particular instant in time, so as to be able to simulate an instantaneous system behavior level, may be more advantageous to enhancing packet data and/or high speed data systems which arise in UMTS, W-CDMA and IEEE 802.11 technologies, for example.

SUMMARY OF THE INVENTION

Exemplary embodiments of the present invention are directed to a method for determining link level performance of random access channel (RACH) preamble detection in a wireless communication system, where link level performance results may be obtained without having to perform extensive simulation. Link-level performance results of RACH preamble detection may be characterized by determining a conditional detection probability. The conditional detection probability may be conditioned upon an instantaneous channel coefficient, and the conditional detection probability may be expressed in terms of an instantaneous detection metric. Instantaneous link-level performance may be characterized by a look-up table, thus a system model evaluated in accordance with the method may accurately represent instantaneous system behavior.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention and wherein.

DETAILED DESCRIPTION OF EXEMPLARY EMBODIMENTS

Figure 1:
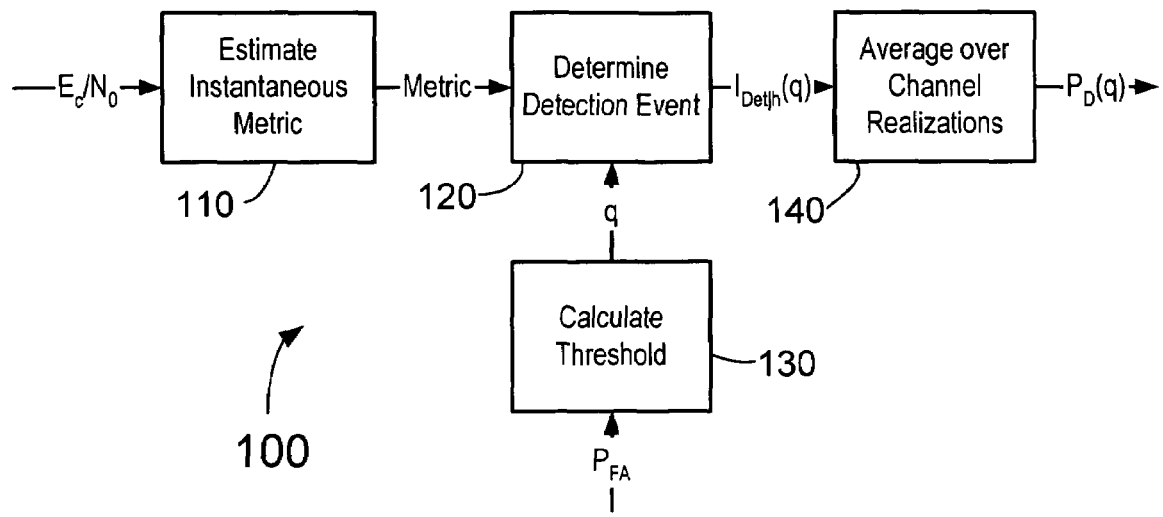
FIG. 1 is a simplified block diagram of conventional link-level preamble detection technique

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile, mobile station and remote station are synonymous and describe a remote user of wireless resources in a wireless communication network.

In general, the exemplary embodiments of the present invention introduce methods for determining link level performance of random access channel preamble detection in a wireless communication system without having to perform extensive simulation. In accordance with the exemplary embodiments, link-level performance of RACH preamble detection may be characterized by determining a conditional detection probability. The conditional detection probability may be conditioned upon an instantaneous channel coefficient. The conditional detection probability may be expressed in terms of an instantaneous detection metric. The instantaneous detection metric may be a function of transmit power, channel coefficients, spatial processing and parameters related thereto, and temporal processing and parameters related thereto. A probability of detection may further utilize a table look-up technique to simplify generating link-level performance results. Instantaneous link-level performance may be characterized by a look-up table, thus a system model evaluated in accordance with the method may accurately represent instantaneous behavior such as instantaneous channel variation and interference characteristic, for example.

As described briefly above, the method for determining link probability of detection performance may be utilized in connection with reception of a random access channel (RACH) in UMTS. However, the exemplary embodiments are not limited to a UMTS, W-CDMA or single-input multiple-output (SIMO) channel, and may be applicable to any wireless communication system involving preambles in Packet Data Access systems for single-input single-output (SISO), SIMO or multiple-input multiple-output (MIMO) channels.

Moreover, conditional detection probability may be determined without any actual link-level simulation. Based on the conditional probability, a detection indictor may be determined. An average of the detection indicators may be determined over several channel realizations. Based on the average over multiple fading channel or spatial channel realizations, for example, an overall probability of detection for detecting a RACH preamble may thus be obtained.

The determined conditional probability may thus be an input to a system simulation, such as a simulation of link-level or system level performance of a UMTS or other wireless communication system. Instead of iterating many simulation runs to generate link-level performance results depending on given channel conditions, only a few conditional probabilities depending on antenna configuration need to be generated utilizing the exemplary method, for input to the system simulation.

Figure 2:
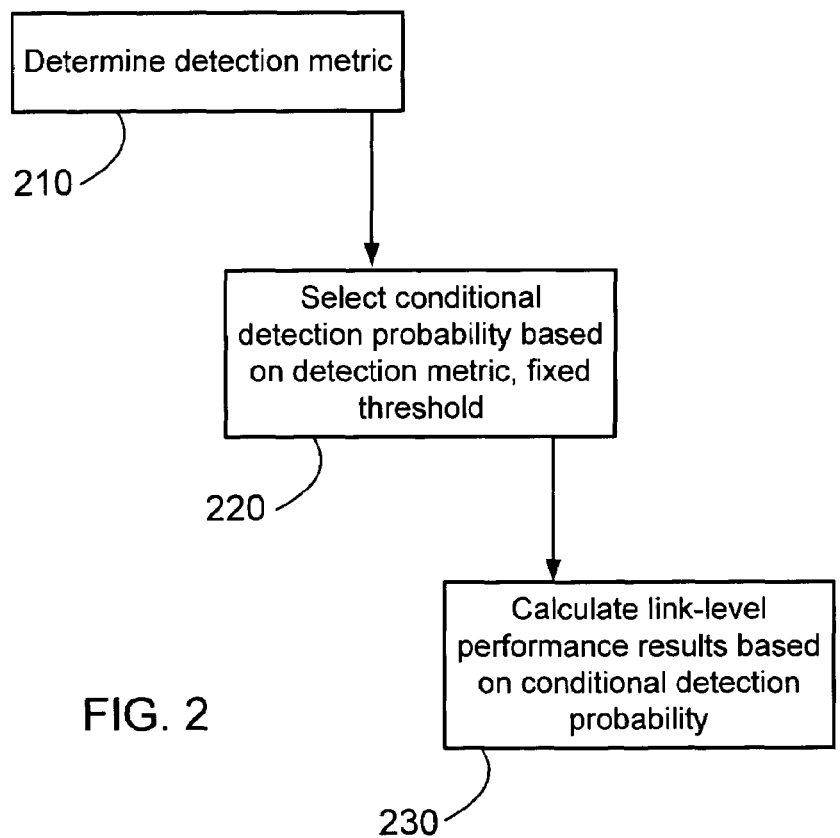
FIG. 2 is a flow diagram illustrating a method of determining link level performance in accordance with the exemplary embodiments of the present invention.

FIG. 2 is a flow diagram illustrating a method of determining link level performance in accordance with the exemplary embodiments of the present invention. Referring to FIG. 2, and for a communication system to be simulated, a detection metric may be determined (function 210) for a given wireless channel coefficient. The channel coefficient may be representative of channel conditions of a particular wireless channel realization to be evaluated during a system simulation, such as a random access channel (RACH), for example. As will be seen in further detail below, the detection metric may be an instantaneous detection metric that is a function of transmit power, channel coefficients, spatial processing and parameters related thereto, and temporal processing and parameters related thereto.

A conditional detection probability ($P_{D|h}(q)$) may be selected (function 220) as an input to the simulation based on the determined detection metric. ($P_{D|h}(q)$) is selected without substantial link-level processing, such as is required in the conventional link-level simulation technique, during a system simulation of the communication system. Based on the selected ($P_{D|h}(q)$), a link level performance result may be calculated (function 230).

As will be described in further detail hereafter, the ($P_{D|h}(q)$) may be selected by accessing a look-up table (LUT). The LUT may include a table of generalized Marcum Q functions, each conditional detection probability corresponding to a given instantaneous detection metric and a given threshold value. The threshold value is referred to as 'q', and depends on antenna configurations and a false alarm probability requirement of the system. The exact calculation of ($P_{D|h}(q)$) will be shown in the following equations hereafter. The given 'q' may be calculated in advance as a function of a probability of an erroneous detection when a signal to be received over a given wireless channel realization is not present (e.g., based on the probability of false alarm ($P_{FA}$)).

The calculation of link level performance of function 230 (which may be reflected as an unconditional probability of detection, ($P_D(q)$)) of a RACH preamble sequence, for example) may include calculating a detection indicator value ($I_{DET|h}$) that represents a detection success or a detection failure of the RACH preamble. The detection indicator value $I_{DET|h}$ may be determined by comparing the selected conditional detection probability ($P_{D|h}(q)$) to a randomly-generated number (a uniform random variable in [0,1]), and outputting the detection indicator value (a '1') if the selected conditional detection probability equals or exceeds the randomly-generated number, for example.

Figure 3:
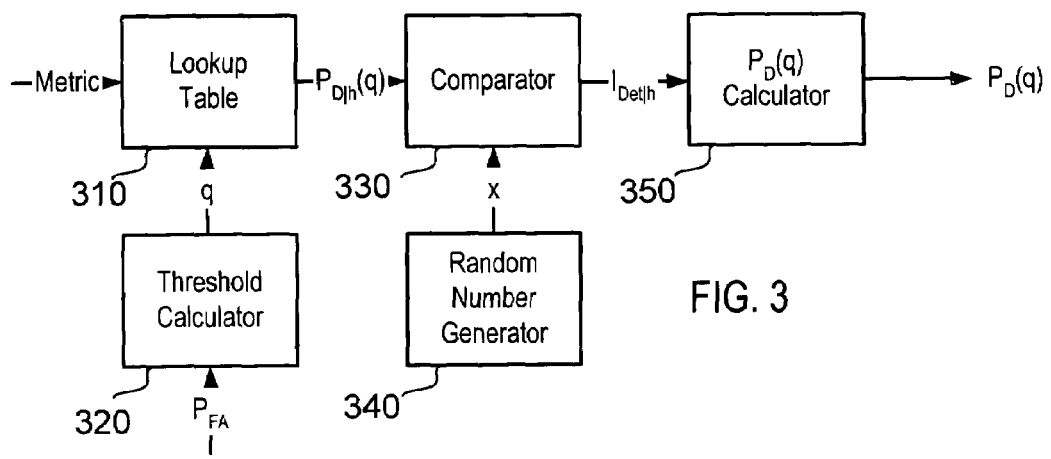
FIG. 3 is block diagram illustrating RACH preamble detection in accordance with the exemplary embodiments of the present invention.

An indicator detection value conditioned on a given fading channel or spatial channel realization ($I_{DET|h}$) may be calculated for each channel realization, i.e., each RACH that is to be evaluated during system simulation. Detection indicator values calculated for all fading channel or spatial channel realizations may be averaged, and a link level performance result, such as an unconditional detection probability for all fading or spatial channel realizations, may be determined based on the average detection indicator value. FIG. 3 is block diagram illustrating RACH preamble detection in accordance with the exemplary embodiments of the present invention. Referring to FIG. 3, from channel parameters (i.e., Ec/No, fading channel coefficient, spatial channel coefficient, etc.) and parameters from various temporal and spatial processing algorithms, an instantaneous received detection metric ('metric') may be measured or estimated (using Equations 6 and 7). Such temporal and spatial processing algorithms are described in detail in co-pending and commonly assigned U.S. patent application Ser. No. (10/651,200), now a U.S. Pat. No. 7,321,645, filed Aug. 29, 2003 to Lee et al., entitled, "METHOD AND ARRANGEMENT FOR DETECTING A RANDOM ACCESS CHANNEL PREAMBLE USING MULTIPLE ANTENNA RECEPTION IN A COMMUNICATION SYSTEM", thus a detailed explanation is omitted here for purposes of clarity.

As an example, however, of the spatial processing and temporal processing that may be used to generate spatial and temporal parameters for measuring or estimating the metric, a brief explanation of how an exemplary RACH preamble may be evaluated is provided. An uplink signal transmitted from a UE may be received by one or more closely-spaced receive antennas of a Node-B receiver. The uplink signal may contain data related to a random access channel preamble, and in particular to one or more (e.g., 16) preamble signature sequences. For example, the uplink signal may be embodied as a RACH preamble carried on the physical random access channel known as a PRACH in the physical layer, which is transmitted on the uplink by the UE.

The uplink signal may be subjected to both spatial processing and temporal processing in order to efficiently detect the RACH preamble. The particular order of processing is flexible: spatial processing may occur before temporal correlation, and vice versa. Spatial processing may be performed using a direct implementation for spatial processing in which all RACH users (e.g., UEs attempting to establish communication with a Node-B of a given cell) share a single 'spatial processing block' in the Node-B receiver architecture. Alternatively, spatial processing may be implemented with a Fast Fourier Transform (FFT) implementation to reduce computational complexity. In either case, the output from spatial processing (if performed after temporal correlation) or the output from temporal processing (if performed after spatial processing) may include parameters used to determine the detection metric.

Utilizing a look-up table 310, the conditional detection probability $P_{D|h}$ (q) may be determined based on the input metric and the given threshold 'q'. The threshold 'q' is determined in advance by a threshold calculator 320 from a probability of false alarm ($P_{FA}$). The threshold value q may be calculated from the false alarm probability relation $P_{FA}(q) = 1 - F^P_{Y|H0}(q)$ where $F_{Y|H0}(q)$ is the cumulative distribution function (CDF) of the decision statistic for null hypothesis and P is the number of beams. CDF $F_{Y|H0}(q)$ is a chi-square distribution which can be obtained in a closed-form. A recursion is used to compute the threshold value q that satisfies the relation in expression (1).

$$q = 0; \quad (1)$$
$$F_{Y/H_0}(q) = 0;$$
$\Delta q$ = Desired resolution for threshold search;
while ($F_{Y/H_0}(q) < (1 - P_{FA})^{1/P}$)
{
   q := q + $\Delta q$;
   Compute $F_{Y/H0}$ (q);
}

The $P_{D|h}$ (q) is compared to a randomly generated number at comparator 330 to determine the detection indicator value ($I_{DET|h}$) that represents a detection success or a detection failure of the RACH preamble. By generating a uniform random variable in [0,1] at random number generator 340 and comparing it to the $P_{D|h}$ (q) at comparator 330, whether a particular access attempt for an access slot was a success or a failure may be determined. The detection indicator conditioned on a channel, $I_{DetDh}$ may thus be accordingly set to a 1 or 0. For example, if $P_{D|h}$ (q) equals or exceeds the uniform random variable generated from random number generator 340, a RACH preamble detection was successful and the $I_{Det|h}$ is set to 1.

An unconditional detection probability $P_D(q)$ may be determined by averaging the detection indicator, $I_{Det|h}$ over repeated access processes with a plurality of channel realizations at averager 350.

The unconditional detection probability $P_D(q)$ may be determined by averaging the detection indicator, $I_{Det|h}$ over repeated access processes with a plurality of channel realizations. Generally, this unconditional detection probability $P_D(q)$ may be represented by expression (2) using CDF of channel f(h).

$$P_D = \int_h P_{D|h}(q) f(h) dh \quad (2)$$

FIGS. 4A through 4D illustrate exemplary antenna configurations evaluated in accordance with the exemplary embodiments of the present invention. The methods in accordance with the exemplary embodiments may be applicable to communication systems employing beamforming antenna technologies. Beamforming antennas represent an array of antennas used to form one or more beams within a cell having controlled beam directions. Beamforming modes may be defined as a flexible mode or a fixed mode. The flexible beamforming mode includes beamforming antennas where the uplink and downlink beams are formed by the application of weight vectors to the received and/or transmitted signals, in order to control the relative phase between the signals applied at the antenna elements. The weight vectors, and hence beam directions, are flexible. Beamforming with a grid of fixed beams (e.g., fixed mode) may be defined as beamforming antennas where the uplink and downlink beams are formed in such a way that the beam directions are fixed.

Figure 4A:
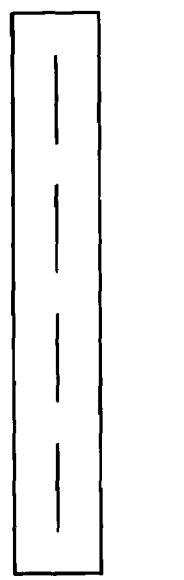
FIGS. 4A through 4D illustrate exemplary antenna configurations evaluated in accordance with the exemplary embodiments of the present invention.
Figure 4B:
Figure 4C:
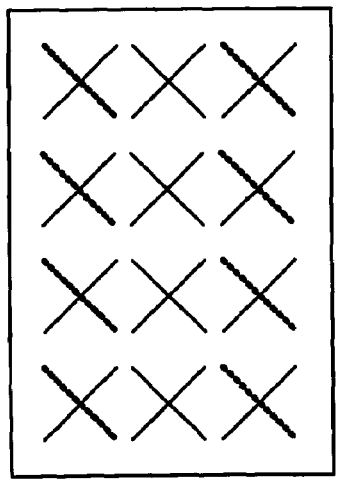
Figure 4D:
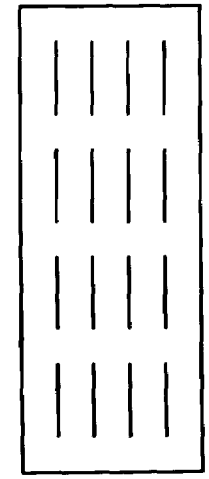

FIG. 4A illustrates a V-1 antenna configuration, which may be embodied by a single antenna with vertical polarization. FIG. 4B illustrates a DIV-2 configuration composed of two widely spaced antennas. The spacing between antenna 'columns' is large as compared to the wavelength of a transmitted or received signal. FIG. 4C illustrates a clustered linear array (CLA-3X) antenna configuration with cross polarization. In a CLA-3X, spacing between antenna elements is a fraction of the wavelength of the transmitted/received signal, hence 'closely-spaced' antenna elements. FIG. 4D depicts a uniform linear array (ULA-4V) antenna configuration. A ULA-4V may be embodied as four (or more) closely spaced antenna elements. In accordance with the exemplary embodiments, a RACH preamble sequence may be received on the uplink by a Node B configured with one of the antenna configurations in FIGS. 4A-4D. The following equations are applicable to determining link-level performance of RACH preamble detection for a Node B having any one of the above antenna configurations Equations for Calculating $P_{D|h}$ and $P_D(q)$ The following expressions may be utilized to determine conditional detection probabilities in accordance with the exemplary embodiments of the present invention. Each detection probability may be a function of received signal power and interference power ($E_c/N_0$). The metric for RACH preamble detection represents an instantaneous received detection metric ('metric') input to LUT 330, and is based on channel parameters (i.e., $E_c/N_0$, fading channel coefficient and/or spatial channel coefficient) and parameters. Table 1 summarizes a list of symbols and descriptions that are used in the following equations.

TABLE 1

| Symbol | Definition |
|---|---|
| $Y^p$ | Decision statistic for angle bin p (angle bin = beam) |
| M | Total number of receive antennas at Node B |
| $M_d$ | Number of receive antennas in antenna cluster d |
| $N_{div}$ | Number of antenna clusters |
| $N_c$ | Coherent accumulation length in number of chips/ |
| P | Number of beams (or angle bins) |
| $E_c$ | Transmitted chip energy |
| $\sigma_c^2$ | Variance of complex chip-rate signal |
| s(n) | Combined signal of preamble signature sequence and scrambling code (combined for temporal processing of signal) |
| $S^p_{d,j}$ | Signal after coherent accumulation of $N_c$ chips for temporal segment j, antenna cluster d, and angle bin p. Also called subcorrelation of segment j (Result from temporal processing) |
| h | Channel coefficient |
| $h_d(j)$ | Channel coefficient of antenna cluster d for subcorrelator j |
| z(n) | Complex white Gaussian noise of chip-rate signal |
| $N_0$ | Power spectral density of the noise z(n) |
| $W^p_d$ | Weighting vector for antenna cluster d, angle p. Dimension of weighting vector is M × 1 |
| d | Antenna cluster index. d = 0, 1, . . . $N_{div}$ |
| j | Subcorrelation block index. j = 0, 1, . . . J − 1 |
| p | Angle bin index, p = 0, 1, . . . P − 1 |
| θ | Angle of arrival of signal |

A decision statistic $Y^p$ for a RACH preamble may be written by expression (3):

$$Y^p = \sum_{d=0}^{N_{div}-1} Y_d^p = \sum_{d=0}^{N_{div}-1} \sum_{j=0}^{J-1} |S_{d,j}^p|^2 \quad (3)$$

For a channel coefficient $h_d$ and weighting vector $W_d^p$, a subcorrelation signal may be determined by the following expression (4):

$$S_{d,j}^p = w_d^{pH}\left[h_d(j)\sum_{n=0}^{N_c-1}\sqrt{E_c}\cdot|s(n)|^2 + \sum_{n=0}^{N_c-1}s(n)z(n)\right] \quad (4)$$

The superscript H denotes Hermitian transpose. Referring to expressions (3) and (4), the real parts (I) and imaginary parts (Q) of $Y_p$ are uncorrelated and have identical variances. The means of the real and imaginary parts are different. Thus, $Y_p$ is noncentral chi-square distributed with $2JN_{div}$ degrees of freedom.

Accordingly, the conditional detection probability may be obtained in terms of what is known as a generalized Marcum's Q function. For a decision statistic which is a noncentral chi-square random variable with a noncentrality parameter $s^2$ and a variance of an underlying Gaussian random variable $\sigma'^2$, the conditional detection probability may be given by expression (5):

$$P_{D|h}(q) = 1 - \prod_{p=1}^{P} Q_{JN_{div}}\left(\frac{s}{\sigma'}, \frac{\sqrt{q}}{\sigma'}\right) \quad (5)$$

The detection metric for the underlying Gaussian random variable $\sigma'^2$ and the noncentrality parameter $s^2$ are given by expressions (6) and (7):

$$s^2 = N_c^2 E_c \sum_{j=0}^{J-1} \sum_{d=0}^{N_{div}-1} |h_d^H(j)w_d^p|^2 \quad (6)$$

$$\sigma'^2 = N_c \frac{\sigma^2}{2} \quad (7)$$

Detection probability for the more general case of multipath fading channel is of interest. Assume that a search window (i.e., the delays over which the time-offset search is conducted) is the set $T=\{\tau'_i, i=1, 2, K\ N_t\}$. For a multipath fading channel with L paths with delays $T_m=\{\tau_1, \ldots \tau_L\}$, probability of detection conditioned on channel maybe written as:

$$P_{D|h}(q) = \quad (7)$$

$$1 - \prod_{l=1}^{L}\prod_{p=1}^{P}\left[1 - Q_{JN_{div}}\left(\sqrt{2N_c\frac{E_c}{N_0}\sum_{j=0}^{J-1}\sum_{d=0}^{N_{div}-1}|h_d^H(j)w_d^p|^2}, \sqrt{\frac{2q}{N_c N_0}}\right)\right]\cdot(1-p_{FA})^{N_t-L}$$

In expression (8), $Q_n(s,\sqrt{t})$ denotes the Marcum's Q function of degree n with non-centrality parameter s. This follows from the fact that is non-central chi-squared distributed with $2JN_{div}$ degrees of freedom.

In a system simulation, given realizations of vector channels across multipaths, subcorrelators and antenna clusters, an instantaneous probability of detection of a RACH preamble may be obtained using equation (8). For each antenna configuration, the value of a threshold q may be found using the probability of false alarm ($P_{FA}$) constraint, as shown in FIG. 3 Accordingly, in order to calculate the conditional probability of detection, the method only refers to a look-up table (LUT) for the Marcum's Q function for different values of the non-centrality parameter s and a fixed threshold value q that is computed in order to maintain a certain required $P_{FA}$. A single LUT for each antenna configuration mapping the metric 's' to conditional detection probability $P_{D|h}$(q) may be constructed for a given, specified threshold q, and hence for a given $P_{FA}$ value.

Figure 5:
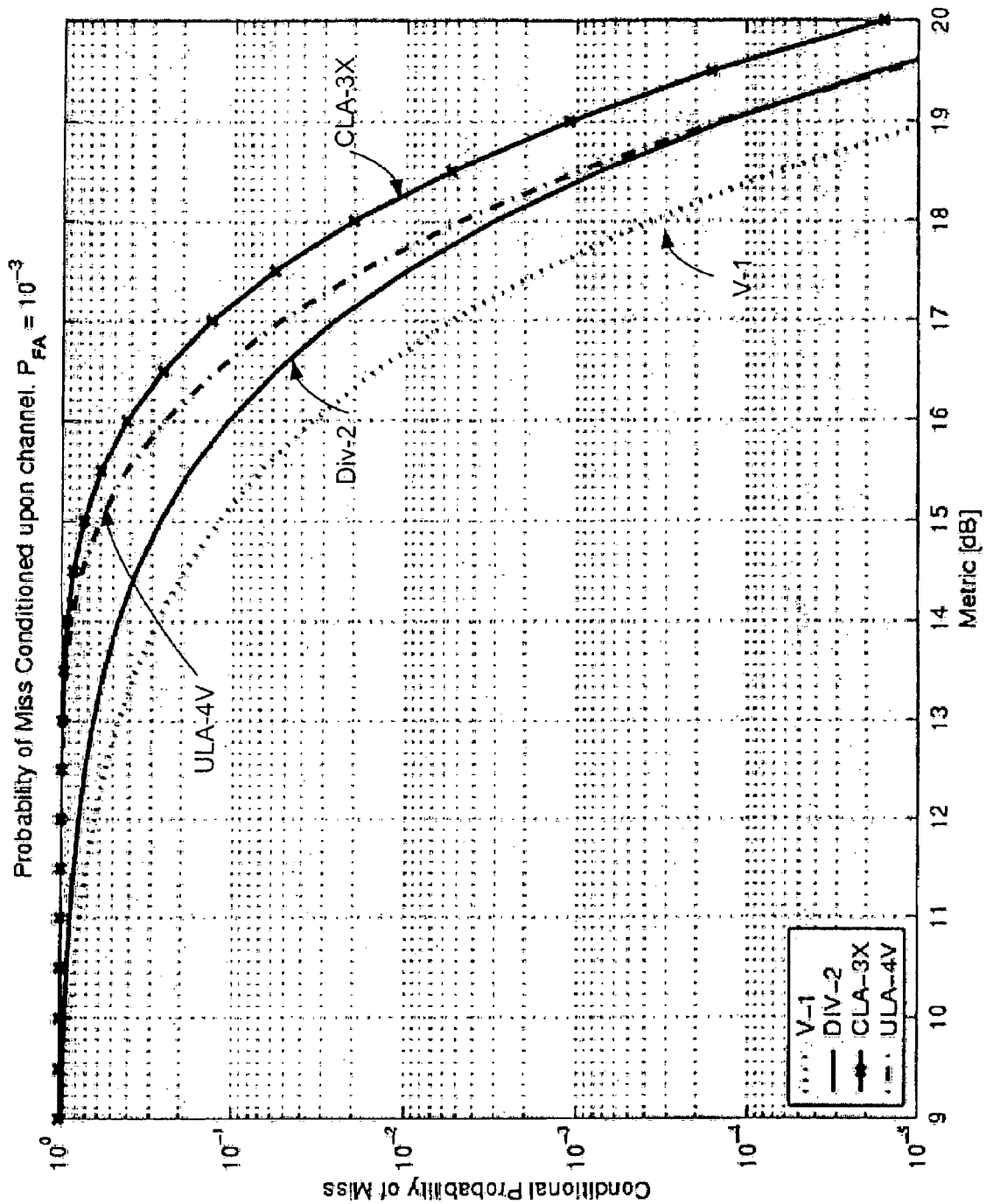
FIG. 5 is a graph illustrating a probability of miss as a function of detection metric for the antenna configurations of FIGS. 4A-4D in accordance with the exemplary embodiments of the present invention.

FIG. 5 is a graph illustrating a probability of miss as a function of detection metric for the antenna configurations of FIGS. 4A-4D in accordance with the exemplary embodiments of the present invention. FIG. 5 compares a conditional probability of miss ($P_{M|h}=1-P_{D|h}$(q)) performance for the four different antenna configurations as a function of detection metric, given $P_{FA}=10^{-3}$. FIG. 5 shows that for the same detection metric value, $P_{M|h}$ varies based on antenna configuration. Diversity order and the threshold values required to satisfy false alarm probability requirement result in differences in performance.

Figure 6:
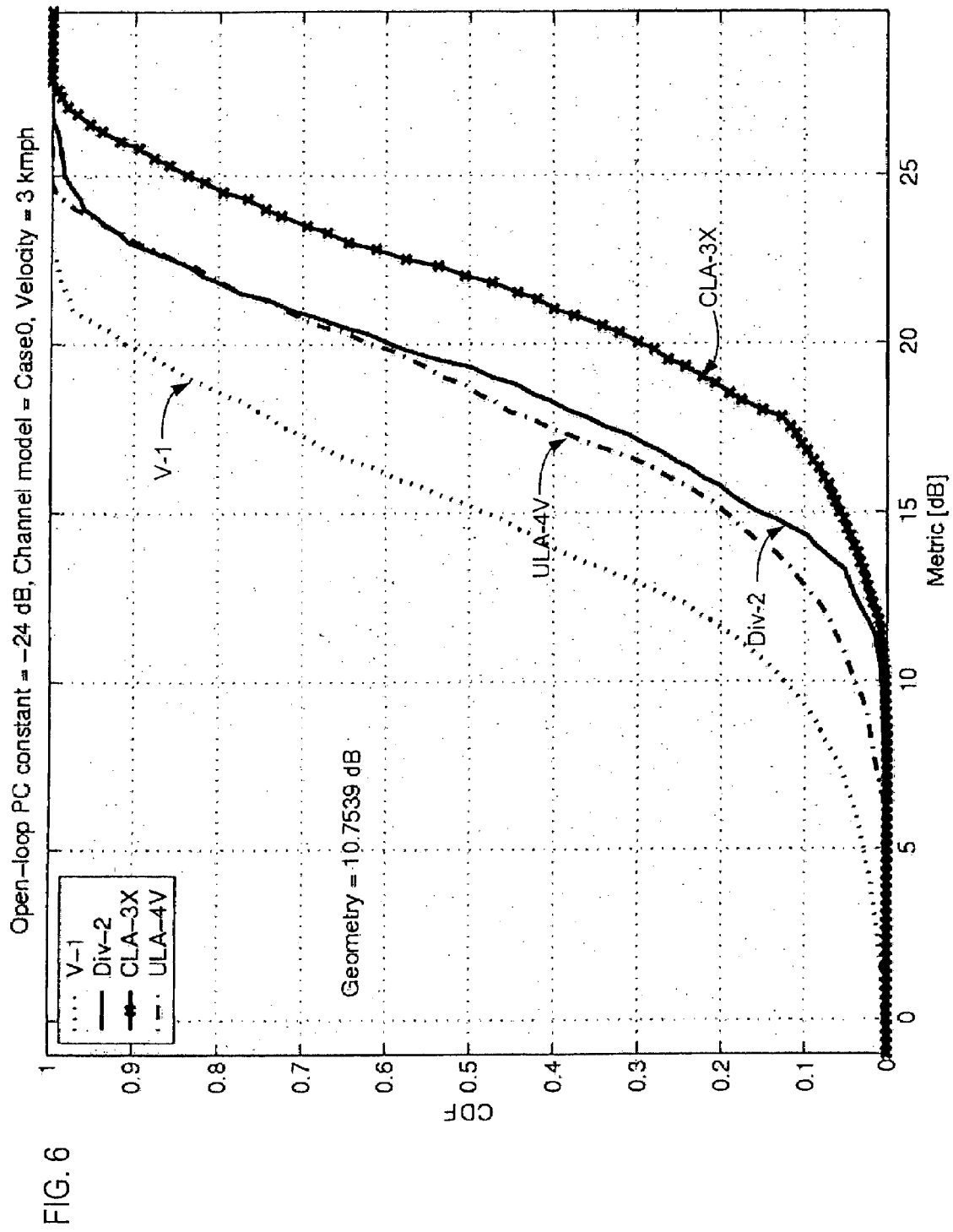
FIG. 6 is a graph illustrating a cumulative distribution function (CDF) of detection metric for the antenna configurations of FIGS. 4A-4D in accordance with the exemplary embodiments of the present invention.

FIG. 6 is a graph illustrating a cumulative distribution function (CDF) of detection metric for the antenna configurations of FIGS. 4A-4D in accordance with the exemplary embodiments of the present invention. A CDF of the detection metric for a single path channel for the four antenna configuration is shown. The CDF was obtained from detection metrics of 30 users dropped at random locations within a cell. The channel was chosen to be a single path spatial channel model with mobile velocity 120 kmph. The open loop power control constant was set such that $E_c/N_0$ operating point was −16 dB. FIG. 6 shows that multiple antenna processing for DIV-2, CLA-3X or ULA-4V increases the detection metric by about up to 3 dB, which in turn would increase link-level RACH preamble detection performance.

Figure 7:
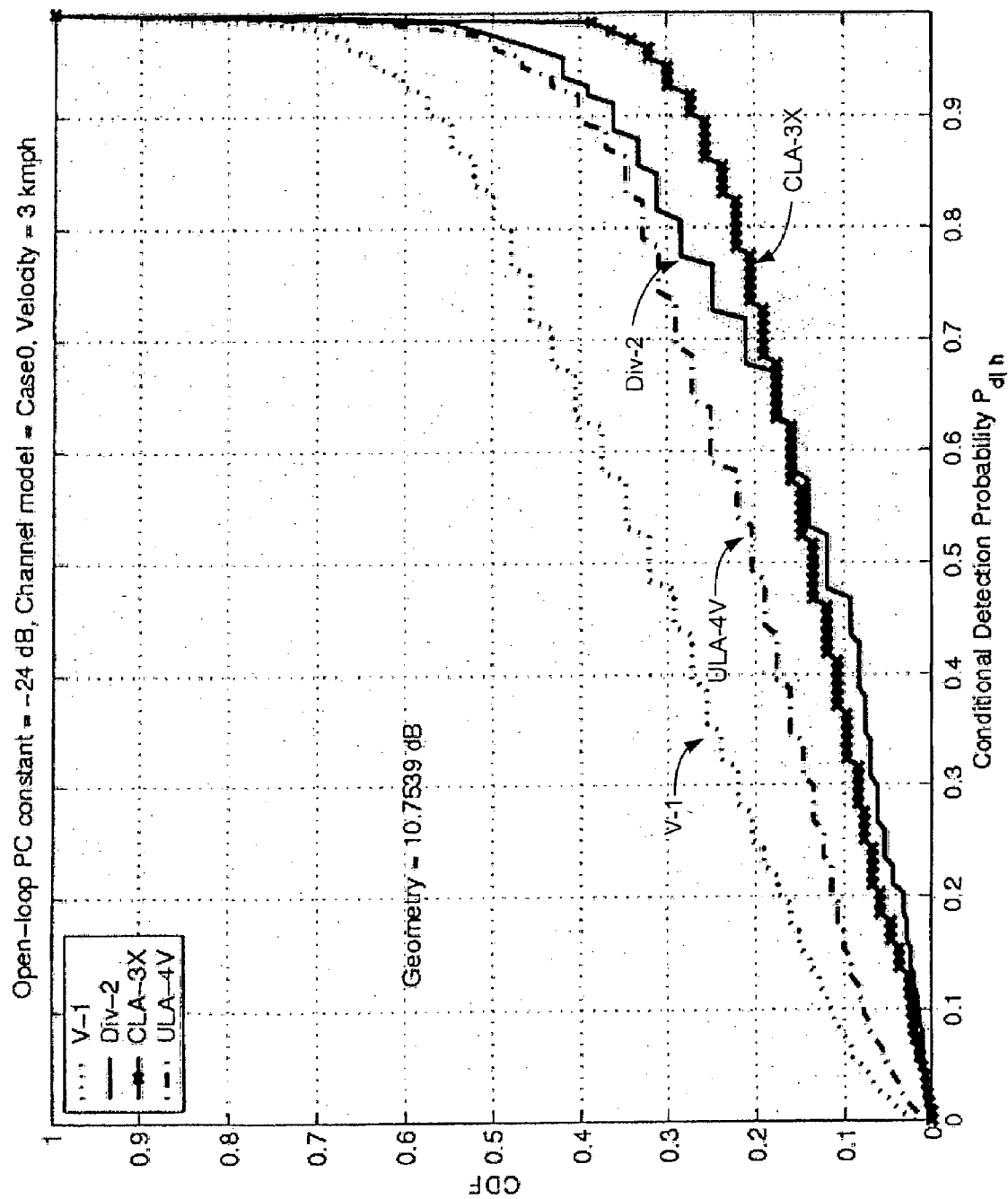
FIG. 7 is a graph illustrating a cumulative distribution function (CDF) of conditional detection probability for the antenna configurations of FIGS. 4A-4D in accordance with the exemplary embodiments of the present invention.

FIG. 7 is a graph illustrating a cumulative distribution function (CDF) of conditional detection probability for the antenna configurations of FIGS. 4A-4D in accordance with the exemplary embodiments of the present invention. FIG. 7 shows the $P_{D|h}$ generated from a system level simulation may be increased using multi-antenna processing.

The exemplary embodiments of the invention being thus described, it will be obvious that the same may be varied in many ways. Such variations are not to be regarded as departure from the spirit and scope of the exemplary embodiments of the invention, and all such modifications as would be obvious to one skilled in the art are intended to be included within the scope of the following claims.

What is claimed is:

1. A method for determining link level performance in a communication system, comprising:
    determining, in a first cellular network element, an instantaneous detection metric for one or more given wireless access channel coefficients representing a plurality of wireless access channel realizations, the determining of the instantaneous detection metric being a function of a spatial processing result from subjecting the access channel to spatial processing in order to simulate actual system performance, wherein spatial processing involves the processing of multiple antenna clusters, the clusters including multiple antennas per cluster, to determine an angle-of-arrival with appropriate antenna weights;
    selecting, in a second cellular network element, a conditional detection probability based on the determined detection metric; and
    calculating, in a third cellular network element, a link level performance result based on the selected conditional detection probability.

2. The method of claim 1, wherein
    calculating a link level performance result includes calculating a detection indicator value that represents a detection success or a detection failure of the access channel.

3. The method of claim 1, wherein the conditional detection probability is selected without link-level processing requiring repeated system simulations of the communication system.

4. The method of claim 1, wherein selecting includes accessing a look-up table to select a conditional detection probability corresponding to the determined detection metric and a given threshold value.

5. The method of claim 4, wherein
    the given threshold value is calculated in advance as a function of a probability of an erroneous detection when a signal to be received over a given wireless access channel realization is not present.

6. The method of claim 2, wherein
    calculating the detection indicator value includes:
        comparing the selected conditional detection probability to a randomly-generated number, and
        outputting the detection indicator value if the selected conditional detection probability equals or exceeds the randomly-generated number.

7. The method of claim 2, wherein the determining, accessing and calculating are repeated for a plurality of wireless access channel realizations, the method further comprising:
    averaging the detection indicator value over the plurality of wireless access channel realizations;
    wherein calculating a link level performance result includes determining an unconditional detection probability for all wireless access channel realizations based on the average detection indicator value.

8. The method of claim 1, wherein
    the detection metric is additionally a function of one or more of transmit power, a wireless channel coefficient of the access channel, and a temporal processing result from subjecting the access channel to temporal processing.

9. The method of claim 1, wherein the first cellular network element, the second cellular network element, and the third cellular network element are the same cellular network element.

10. A method for determining random access channel (RACH) preamble detection performance in a communication system, comprising:
    determining, in a first cellular network element, for each given RACH preamble of a plurality of wireless channel realizations, a conditional detection probability, the conditional detection probability determined without link-level processing requiring repeated system simulations of the communication system;
    calculating, in a second cellular network element, an unconditional detection probability for determining RACH preamble detection performance as an average detection probability over the plurality of wireless channel realizations; and determining, in a third cellular network element, an instantaneous detection metric for a given wireless channel realization that is a function of a spatial processing result from subjecting the RACH preamble to spatial processing in order to simulate actual system performance, wherein spatial processing involves the processing of multiple antenna clusters, the clusters including multiple antennas per cluster, to determine an angle-of-arrival with appropriate antenna weights.

11. The method of claim 10 wherein calculating an unconditional detection probability includes calculating a detection indicator value that represents a detection success or a detection failure of a RACH preamble.

12. The method of claim 11, wherein
calculating the detection indicator value includes:
comparing the selected conditional detection probability to a randomly-generated number, and
outputting the detection indicator value if the selected conditional detection probability equals or exceeds the randomly-generated number.

13. The method of claim 12, wherein
calculating the detection indicator value is repeated for each of the plurality of wireless channel realizations, and calculating the unconditional detection probability further comprises averaging the detection indicator value over the plurality of wireless channel realizations, the unconditional detection probability determined based on the average detection indicator value.

14. The method of claim 10, wherein determining a conditional detection probability includes:
accessing a look-up table to select a conditional detection probability corresponding to the determined detection metric.

15. The method of claim 14, wherein the detection metric is additionally a function of one or more of transmit power, a wireless channel coefficient of the given RACH preamble, and a temporal processing result from subjecting the RACH preamble to temporal processing.

16. The method of claim 15, wherein
the given threshold is calculated in advance as a function of a probability of an erroneous detection of the given RACH preamble.

17. The method of claim 10, wherein the first cellular network element, the second cellular network element, and the third cellular network element are the same cellular network element.

* * * * *

UNITED STATES PATENT AND TRADEMARK OFFICE
CERTIFICATE OF CORRECTION

PATENT NO. : 7,643,438 B2 Page 1 of 1
APPLICATION NO. : 10/649797
DATED : January 5, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1485 days.

Signed and Sealed this

Twenty-first Day of December, 2010

David J. Kappos
*Director of the United States Patent and Trademark Office*